United States Patent
Glickman et al.

(10) Patent No.: US 10,320,562 B2
(45) Date of Patent: Jun. 11, 2019

(54) APPLICATION SPECIFIC LOW-POWER SECURE KEY

(71) Applicant: FREESCALE SEMICONDUCTOR, INC., Austin, TX (US)

(72) Inventors: Eran Glickman, Rishon Le Zion (IL); Ron M. Bar, Ramat Hasharon (IL); Omer Sharon, Modiin (IL)

(73) Assignee: NXP USA, Inc., Austin, TX (US)

( * ) Notice: Subject to any disclaimer, the term of this patent is extended or adjusted under 35 U.S.C. 154(b) by 267 days.

(21) Appl. No.: 15/169,831

(22) Filed: Jun. 1, 2016

(65) Prior Publication Data
US 2017/0353305 A1 Dec. 7, 2017

(51) Int. Cl.
*H04L 9/08* (2006.01)
*G06F 21/75* (2013.01)

(52) U.S. Cl.
CPC ............ *H04L 9/0861* (2013.01); *G06F 21/75* (2013.01); *H04L 9/0891* (2013.01)

(58) Field of Classification Search
CPC ................................. H04L 9/0861; H04L 9/08
USPC .......................................................... 380/44
See application file for complete search history.

(56) References Cited

U.S. PATENT DOCUMENTS

| | | | |
|---|---|---|---|
| 8,175,276 B2 | 5/2012 | Tkacik et al. | |
| 8,812,875 B1 | 8/2014 | Melvin | |
| 2004/0234073 A1 | 11/2004 | Sato et al. | |
| 2007/0180276 A1 | 8/2007 | Everett et al. | |
| 2008/0282087 A1 | 11/2008 | Stollon et al. | |
| 2009/0323942 A1* | 12/2009 | Sharon | G11C 7/1006 380/44 |
| 2010/0067689 A1 | 3/2010 | Laffey | |
| 2013/0198528 A1 | 8/2013 | Walrath | |
| 2013/0297980 A1* | 11/2013 | Chen | G01R 31/3177 714/726 |

FOREIGN PATENT DOCUMENTS

WO 2005059727 A1 6/2005

* cited by examiner

*Primary Examiner* — Evans Desrosiers (57) ABSTRACT

A key generator including a low-power key adjust circuit, and a high-power key adjust circuit. The low-power key adjust circuit including a storage location to store an original key, a shifter to shift the original key by a number of steps to shift to create a first key, and an output to provide the first key. The high-power key adjust circuit including an input coupled to the output of the low-power key adjust circuit to receive the first key, a scrambler to scramble the first key to create a scrambled key, and select circuitry to select either the first key or the scrambled key to output from the high-power key adjust circuit based on a bit in a configuration register.

20 Claims, 5 Drawing Sheets

APPLICATION SPECIFIC LOW-POWER SECURE KEY

BACKGROUND

Field of the Disclosure

Communication of secured data traffic is wide spread through most applications executed in user devices. For example, a user may want to send secure data when sending electronic mail messages, performing online banking transactions, and the like. Typically the secured data traffic sent during these types of communications can be secured via keys used to encrypt the data. Preferably, these keys are not shared between applications or memory regions in a user device, so as not to allow a potential hacker accessing secure data in higher-security areas by hacking into lower-security areas. The keys can be kept in a non-volatile memory so that they will be retained during a power failure of the device. However, a hacker may breach the device while the power is off, and can still access the key stored in the non-volatile memory. Thus, a key stored in a non-volatile memory is capable of being stolen by a hacker even if the device experiences power loss. The keys can also be stored in a volatile memory location that is powered by a power source, such as a battery, that is integrated into a particular application thereby overcoming the problems associated with non-volatile memory. However, the useful life of the particular application is limited to that of the power source, which limits the ability to manipulate keys stored within the battery operated region.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A host device includes a key generator, a security engine, hardware accelerators, a core complex, a memory controller, and a coherency fabric. During operation of the host device, a processor in the core complex can execute an application that provides secure data to another component within the host device or to a component within another device. While executing the application, the processor can determine that a key is needed to encrypt some data and can provide a key request signal to the security engine. In an embodiment, the key request signal can include an application identification (ID) that identifies the application requesting the key, and a number of steps to shift an original key. In an embodiment, when the execution of the application results in data being stored in a memory, the application ID can be a memory region identifier, a portion of an address to be accessed by the application, or the like. The term original key as used herein is intended to refer to a key that is stored at a portion of the key generator that is powered by a different power source than other portions of the application, such as a battery. The original key can be used to generate an application specific key. The term application specific key as used herein is intended to refer to a key that is generated based on an application ID provided to the key generator.

The key generator can have two different power consumption regions: a high power consumption region and a low power consumption region. The high power consumption region is provided with power from a power supply that is continuously provided while the host device is powered on. The low power consumption region is provided with power from a battery. In a specific embodiment, the low-power consumption region is exclusively provided with power from the battery. Thus, the amount of power consumed by the components in the low power consumption region should be kept a low as possible so that the battery is not drained. High-power key adjust circuitry located within the high power consumption region includes a scrambler, a configuration register, a memory, and a selector. Battery domain circuitry located in the low power consumption region of the key generator includes a key register and a low-power key adjust circuit.

The security engine provides the application ID and the number of steps, located in the key request signal, to the key generator. High-power key adjust circuitry can then store, in the configuration register, the application ID and the number of steps to shift the key. The original key value is not set or stored in the battery domain via fuses or pins. The key register of the battery domain circuitry can store the original key value that can be modified based on the application ID and the number of steps to shift the key. The key register is a volatile memory in the battery domain circuitry. Thus, if the power provided from the battery to the battery domain circuitry is lost, the original key stored in the key register will be erased. Therefore, the key generator can prevent hackers from breaching the host device and retrieving the original key when the power from the battery is lost, because the original key is more secure when stored in the volatile memory than an original key that is stored in a non-volatile memory.

The low-power key adjust circuit can either scramble and shift the original key based on the application ID and the number of steps to shift the key to create a first key, or can only shift the original key based on the number of steps to shift the key to create a first key. The low-power key adjust circuit of the battery domain circuitry can therefore provide multiple different first keys to the high-power key adjust circuitry based upon a single key, which avoids having to store multiple keys in the volatile memory of the battery domain circuitry—reducing power consumption of the volatile memory. The first key, provided from the low-power adjust circuit, can be scrambled by the scrambler of the high-power key adjust circuitry based on the application ID to create a second key. The selector of the high-power key adjust circuitry can then provide either the first key or the second key to the security engine as a generated key, which in turn can provide the generated key to the application that requested the key. The key generator can then selectively replace the single key stored in the key register with the generated key to create a new original key for the key generator. Specific embodiments, of the present disclosure will be better understood in reference to FIGS. 1 through 5.

Figure 1:
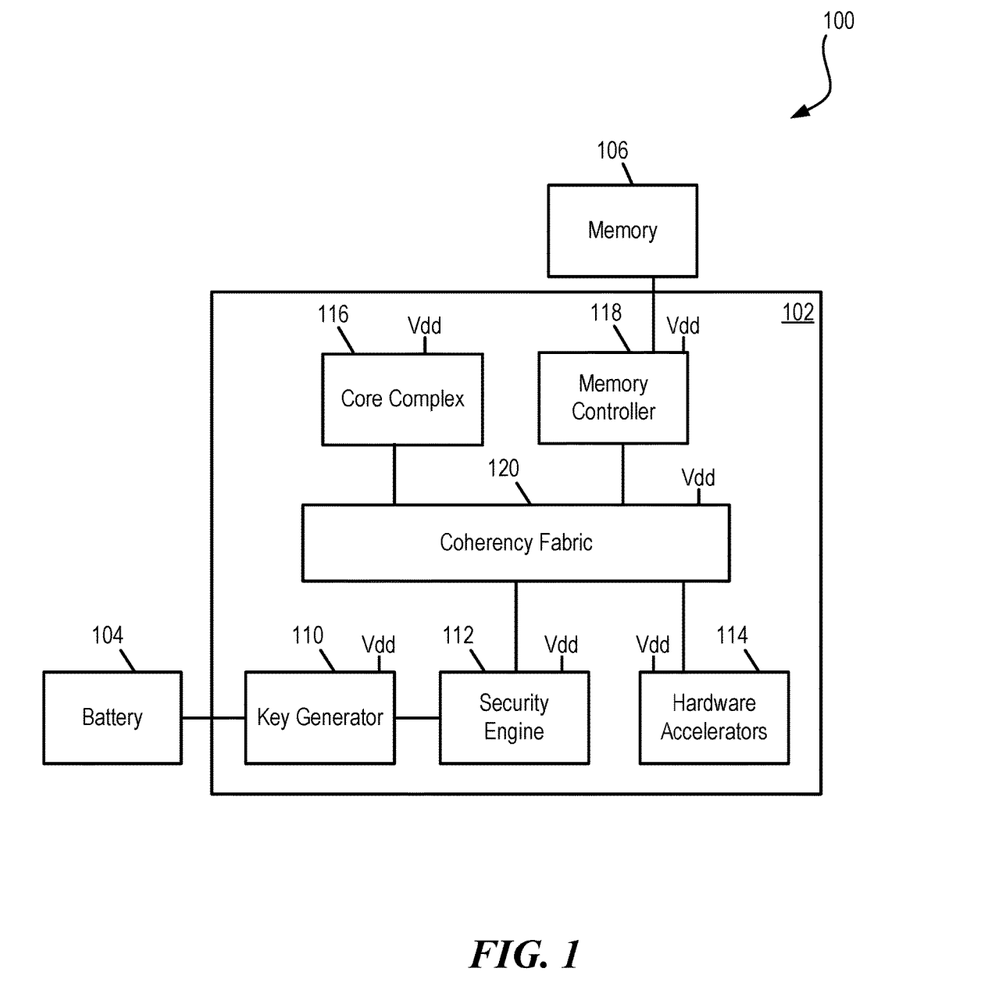
FIG. 1 illustrates a host device that includes a key generator to provide keys for encrypting data in accordance with at least one embodiment of the disclosure.

FIG. 1 illustrates a system 100 that includes a host device 102, a battery 104, and a memory 106. The host device 102 includes a key generator 110, a security engine 112, hardware accelerators 114, a core complex 116, a memory controller 118, and a coherency fabric 120. The key generator 110 is in communication with the security engine 112, which in turn is in communication with the hardware accelerators 114, the core complex 116, and the memory controller 118 via the coherency fabric 120. The memory controller 118 is in communication with the memory 106. The core complex 116 can include multiple processor cores to execute applications. In an embodiment, the memory 106 can be part of the host device 102, which can be an integrated circuit die.

Some of the components within the host device 102, e.g., the security engine 112, the hardware accelerators 114, the core complex 116, and the memory controller 118, can be provided power from a common supply voltage, $V_{dd}$, which can provide a continuous supply voltage to the components while the system 100 is powered on. Only a first portion of the key generator 110 is provided power from the supply voltage, Vdd, and a second portion of the key generator 110 is provided power only from the battery 104. Thus, at least a portion of the key generator 110 can be continuously provided with battery power, even if the remaining portions of system 100 are powered down. The retention of the original key in the key generator 110 can be in a non-permanent manner within a volatile memory of the key generator 110, which permits the use of various defensive mechanisms that are aimed at defeating breaching attempts by hackers, such as when a breach into the host device 102 disables the power provided from the battery 104 to the key generator 110.

During operation of the host device 102, a processor in the core complex 116 can execute an application that provides secure data to another component within the host device 102, to a component within another device, or both. While executing the application, the processor within the core complex 116 can determine that a key is needed to encrypt some data, e.g., generate the secure data, and can provide a key request signal to the security engine 112. In an embodiment, the key request signal can include an application identification (ID) to identify the application requesting the key, a number of steps to shift an original key that is stored in the key generator 110, and an indication whether to replace the original key with a newly created key at the end of the key generation process, such that the newly created key is stored as the original key in the key generator 110. In an embodiment, the indication to replace the original key can be provided in response to a low-level breach, such as an attempt to access one of the processors in the core complex 116, of the host device 102 being detected.

The security engine 112 can extract the application ID, the number of steps to shift the original key, and the indication whether to replace the original key and then provide this information to the key generator 110, which in turn utilizes the application ID and the number of steps to shift the original key to generate a key for encrypting data. Upon completion of the key generation, the key generator 110 can provide the generated key to the security engine 112, which in turn can provide the generated key to processor of the core complex 116 for encrypting data during execution of the associated application. Thus, the security engine 112 can interface between the key generator 110 and the other components of the host device 102.

In one situation, the core complex 116 may use the generated key to encrypt data before the data is transferred to the memory controller 118 for storage in the memory 106. In another situation, the generated key can be provided to the hardware accelerators 114, which in turn can encrypt data using the generated key at the request of the application. Thus, in this situation the processor of the core complex 116 can forward the generated key to the hardware accelerators 114, or can provide destination information for the generated key in the key request that the security engine 112 can utilize to determine the end component for the generated key. However, in any situation, the key generator 110 generates a key based on a particular application ID as will be described in greater detail below with respect to FIG. 2.

Figure 2:
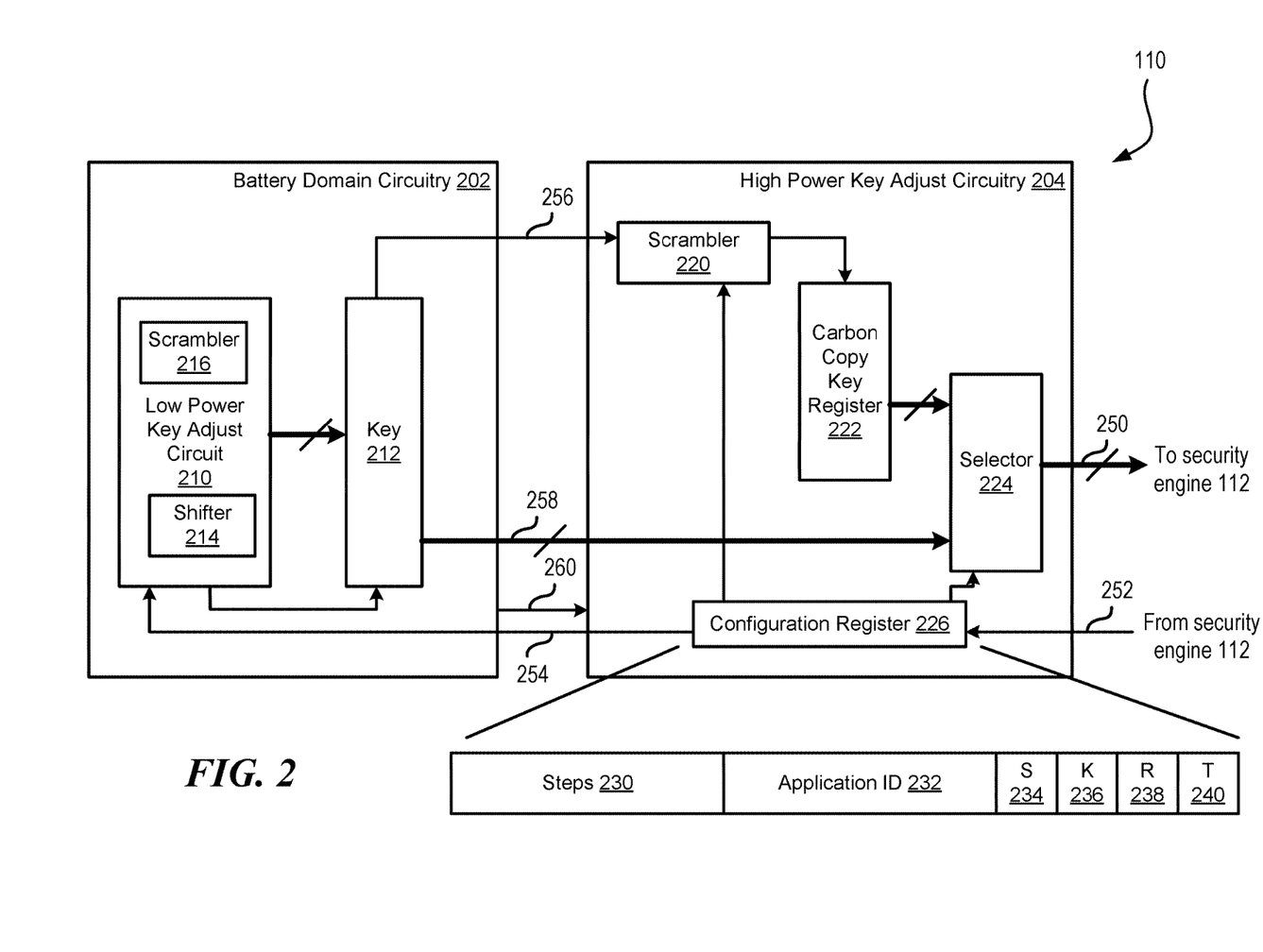
FIG. 2 illustrates the key generator of FIG. 1 in greater detail in accordance with at least one embodiment of the disclosure.

FIG. 2 illustrates the key generator 110 in greater detail in accordance with at least one embodiment of the disclosure. The key generator 110 includes two portions: a low power consumption region including battery domain circuitry 202 and a high power consumption region including high-power key adjust circuitry 204. The high power consumption region is provided with power only from the power supply, Vdd, which is continuously provided while the host device 102 is powered on. The low power consumption region can be provided with power only from the battery 104. The battery domain circuitry 202 includes a low-power key adjust circuit 210, and a key register 212. The low-power key adjust circuit 210 includes a shifter 214 and a scrambler 216. The high-power key adjust circuitry 204 includes a scrambler 220, a carbon copy key register 222, a selector 224, and a configuration register 226. The configuration register 226 can include multiple fields, including: a steps field 230, an application ID field 232, a select field 234, a keep field 236, a ready field 238, and a trivial field 240.

During operation, upon the host device 102 coming out of a reset an application executing on a processor of the core complex 116 can start a key generation process by providing the security engine 112 with an application ID associated with the executing application, and a number of steps that an original key in the key generator 110 should be shifted to create a new application specific key. As indicated above, the term original key refers to a key that is stored at the key register 212, which is a volatile memory powered by the battery 104. The application specific key is a key that is generated based on the original key and on the application ID provided to the key generator 110. The security engine 112 can also receive a "keep" indication signal that identifies whether a key generated in the battery domain circuitry 202 should replace the original key in the key register 212, thus becoming the new original key after completion of the key generation process. In an embodiment, the keep indication signal can be provided in response to a low level breach, by a hacker, into the host device 102. In an embodiment, one or more applications executed in the core complex 116 can detect a low level breach and cause the original key to be replaced via the keep indication signal.

The security engine 112 can then provide the application ID, the number of steps to shift the original key, and a keep indication signal to the configuration register 226 of the high-power key adjust circuitry 204 via the host configuration bus 252. The high-power key adjust circuitry 204 can then store the application ID in the application ID field 232 and the number of steps to shift the key in the steps field 230.

The high-power key adjust circuitry 204 can set a bit in the keep field 236 of the configuration register 226 based on keep indication signal. For example, if the high-power key adjust circuitry 204 determines that the original key is to be replaced with the key generated in the battery domain circuitry 202, the keep field 236 can be asserted, e.g., set to a logical value of value of 1. If the high-power key adjust circuitry 204 determines that the original key is to be maintained, the keep field 236 can be negated, e.g., set to a logic value of 0. One of ordinary skill in the art would recognize that the setting of the bit to specific values can be reversed without varying from the scope of the disclosure. Similarly, any other value or indication can be stored within the keep field 236 to indicate whether to keep the newly created key without varying from the scope of the disclosure.

The key register 212 of the battery domain circuitry 202 can store a single original key value that can be modified based on the application ID and the number of steps to shift the key to create multiple different secure keys. In different embodiments, the original key value that is stored at the key register 212 at the start of a key generation process can be the same as, or different from, the original key value at the start of a previous key generation process. The high-power key adjust circuitry 204 can provide the values stored the keep field 236, the application ID field 232, and the steps field 230 to the low-power key adjust circuit 210 of the battery domain circuitry 202 via a control bus 254.

The low-power key adjust circuit 210 can utilize the application ID to determine whether to scramble the original key stored in the key register 212. In an embodiment, the low-power key adjust circuit 210 can always make the same determination whether to scramble the original key, and the manner in which the original key is scrambled for a particular application ID. For example, every time the low-power key adjust circuit 210 receives a first particular application ID, the scrambler 216 can scramble the original key and store an initial scrambled key in the key register 212. However, every time the low-power key adjust circuit 210 receives a second particular application ID, the low-power key adjust circuit 210 can make a determination not to the scramble the original key. In an embodiment, the scrambler 216 can utilize the entire original key or only portions of the original to create the initial scrambled key. The scrambler 216 increases the amount of power consumed within the low-power key adjust circuit 210. Thus, in an embodiment, the low-power key adjust circuit 210 does not include the scrambler 216 to reduce the amount of power consumed in the battery domain circuitry 202.

After the original key is scrambled or a determination is made not to scramble the original key, the low-power key adjust circuit 210 can provide the number of steps to shift the key to the shifter 214, which in turn can shift the key, e.g., either the original key or the initial scrambled key, stored in the key register 212 from one end to the other in response to the number of steps to create a shifted key in the key register 212. In an embodiment, the number of steps can be larger than the number of bits in the original key. Thus, the bits of the original key or the initial scrambled key may be shifted more than just one time around to create the shifted key. The shifted key can then be provided from the key register 212 to the scrambler 220 of the high-power key adjust circuitry 204 via the bus 256. In an embodiment, the shifted key can be output from the key register 212 to the scrambler 220 serially, e.g., in a bit-by-bit manner. The shifted key can also be provided from the key register 212 to the selector 224 via the communication interconnect 258. In an embodiment, the shifted key can be stored at an intermediate storage location of the high-power circuitry 202, instead of being provided directly from the key register 212 to the selector 224. The low-power key adjust circuit 210 can then provide a ready signal to the high-power key adjust circuitry 204 via the interconnect 260.

In an embodiment, the ready signal can indicate that the low-power key adjust circuit 210 has generated the shifted key and that the shifted key is valid. In an embodiment, the shifted key is valid in response to the shifted key not being either the same as the original key or not being all zeros. The ready field 238 can then be asserted, e.g., set to a logical value of value of 1, in response to the ready signal. However, if the high-power key adjust circuitry 204 has not received the ready signal, the bit in the ready field 238 can remain negated. In an embodiment, the application executing on a processor of the core complex 116 can poll the configuration register 226 to determine whether the original key has been shifted and the determination can be made based on the value of the ready field 238.

Upon the scrambler 220 receiving the shifted key, the scrambler 220 can create a scrambled key based on the application ID received from the configuration register 226. The scrambler 220 can then store the scrambled key in the carbon copy key register 222. In an embodiment, the scrambler 220 can be a mash of wires and logic to scramble the shifted key based on the application ID received from the application ID field 232 of the configuration register 226. Thus, in an embodiment that includes scrambler 216 in the low-power key adjust circuit 210, the original key can be scrambled twice, e.g., once by scrambler 216 before the key is shifted and again by scrambler 220 after the key is shifted, and both of the scramblers 216 and 220 can perform the scrambling based on the application ID. In an embodiment that includes only scrambler 220, the original key can be scrambled only once, e.g., after the key is shifted, and the scrambler 220 can perform the scrambling based on the application ID. The same scrambled key can be regenerated each time the same application ID and the same number of steps is provided to the key generator 110.

Upon the scrambled key being stored in the carbon copy key register 222, the high-power key adjust circuitry 204 can make a determination whether the carbon copy key is zero. In an embodiment, the carbon copy key can be zero in response to an error being produced by one of the components of the key generator 110, such as the shifter 214, the scrambler 216, or the scrambler 220. If the carbon copy key is zero then the bit of trivial field 240 is asserted. If the high-power key adjust circuitry 204 determines that carbon copy key is not zero, then the bit in the trivial field 240 can be negated. The scrambled key stored in the carbon copy key register 222 is provided to the selector 224 via a first input of the selector 224 and the shifted key is provided to the selector 224 via a second input of the selector 224.

The high-power key adjust circuitry 204 can then set a bit of the select field 234 based on the values of the ready field 238 and the trivial field 240. For example, the bit of the select field 234 can be asserted if the ready field 238 is set to a value indicating that the key generation of the shifted key is completed and that the shifted key is valid, and the trivial field 240 is set to indicate that the scrambled key in the carbon copy key register 222 is non-zero and therefore usable. However, if the ready field 238 is negated, e.g., set to a value indicating that the key generation of the shifted key is not complete, that the shifted key is not valid, or that the trivial field 240 is negated. Thus, in this example, when select field 234 is asserted the scrambled key in the carbon copy key register 222 is to be provided to the output 250 of the selector 224, and when select field is negated, the shifted key is to be provided to the output 250 of the selector 224. One of ordinary skill in the art would recognize that the setting of the bit to specific values can be reversed without varying from the scope of the disclosure. After either the shifted key or the scrambled key is output, the low-power key adjust circuit 210 can determine whether the keep field 236 is asserted. If so, the shifted key is stored as the new original key in the key register 212. However, if the keep field 236 is negated, the shifted key is shifted to revert back to the original key, which is then stored in the key register 212.

Thus, the key generator 102 includes key register 212 in a volatile memory in the battery domain circuitry 202. Therefore, if the power provided from the battery 104 is lost, the original key stored in the key register 212 will be erased. Thus, in order for the original key to be able to be erased fuses and pins cannot be used to set the original key in the battery domain circuitry 202. Therefore, the key generator 110 can prevent hackers from breaching the host device and retrieving the original key when the power from the battery 104 is lost, such that the original key is more secure than an original key that is stored in a non-volatile memory. Additionally, the low-power key adjust circuit 210 of the battery domain circuitry 202 can provide multiple different first keys to the high-power key adjust circuitry 204 without having to store multiple keys in the key register 212, which reduces power consumption in the battery domain circuitry 202.

In an embodiment, the key generator 102 can produce a generated key based only on the number of steps to shift the original key. In this embodiment, the security engine 112 can provide the number of steps to shift the original key to the configuration register 226 of the high-power key adjust circuitry 204 via the host configuration bus 252. The high-power key adjust circuitry 204 can then store the number of steps to shift the key in the steps field 230. The shifter 214 can then shift the key stored in the key register 212 from one end to the other in response to the number of steps to create a shifted key in the key register 212. The shifted key can be provided from the key register 212 to the output 250 of the key generator 102 as the generated. Thus, in this embodiment, the generated key can be based only on the number of steps to shift the original key without the key being scrambled.

Figure 3:
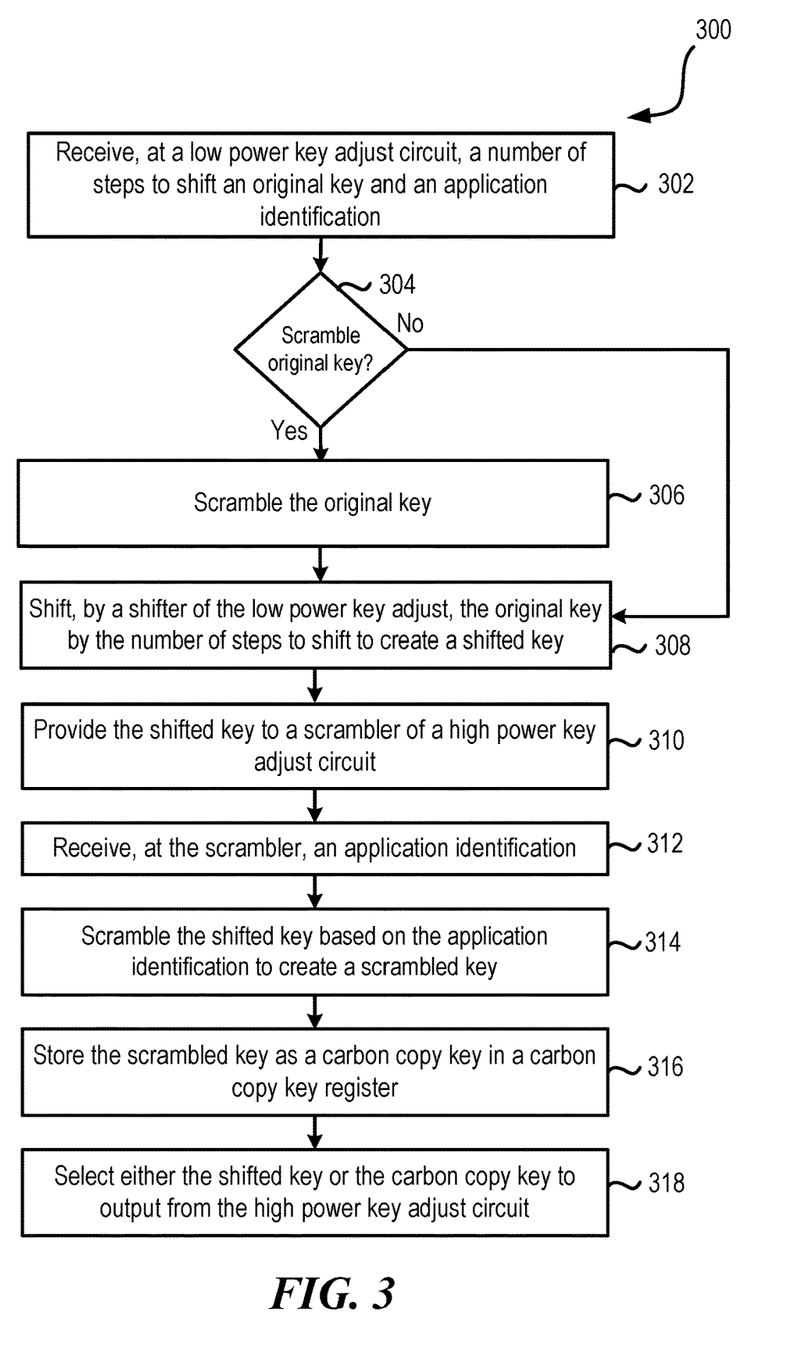
FIG. 3 illustrates a flow diagram of a method for providing a key to encrypt data in accordance with at least one embodiment of the disclosure.

FIG. 3 illustrates a flow diagram of a method for providing a key to encrypt data in accordance with at least one embodiment of the disclosure. At block 302, a number of steps to shift an original key and an application ID are received. In an embodiment, the application ID identifies an application executing in a processor that is to utilize the generated key to encrypt data. In an embodiment, the number of steps to shift the original key and the application ID can be retrieved from a key request signal via the security engine 112 of FIG. 1. In an embodiment, the number of steps to shift the original key can be received by the low-power key adjust circuit 210 of the battery domain circuitry 202 of FIG. 2. At block 304, a determination is made whether to scramble the original key based on the application ID. If the original key is to be scrambled based on the application ID, the original key is scrambled at block 306 and the flow continues to block 308. Otherwise, the flow continues at block 308 without the original key being scrambled. The original or scrambled key is shifted by the received number of steps to shift to create a shifted key at block 310. In an embodiment, the shifter 214 of FIG. 2 can shift the original key by the number of indicated steps received.

At block 312, the shifted key is provided to a scrambler of a high-power key adjust circuit. In an embodiment, the shifted key can be output from a key register in the battery domain to the scrambler serially, e.g., in a bit-by-bit manner.

At block 314, an application ID is received at the scrambler. At block 316, the shifted key is scrambled based on the application ID to create a scrambled key. The scrambled key is stored as a carbon copy key in a carbon copy key register 318. At block 320, either the shifted key or the carbon copy key is selected to be output from the high-power key adjust circuit. In an embodiment the selection between the shifted key and the carbon copy key is based on a determination whether the carbon copy key is usable.

Figure 4:
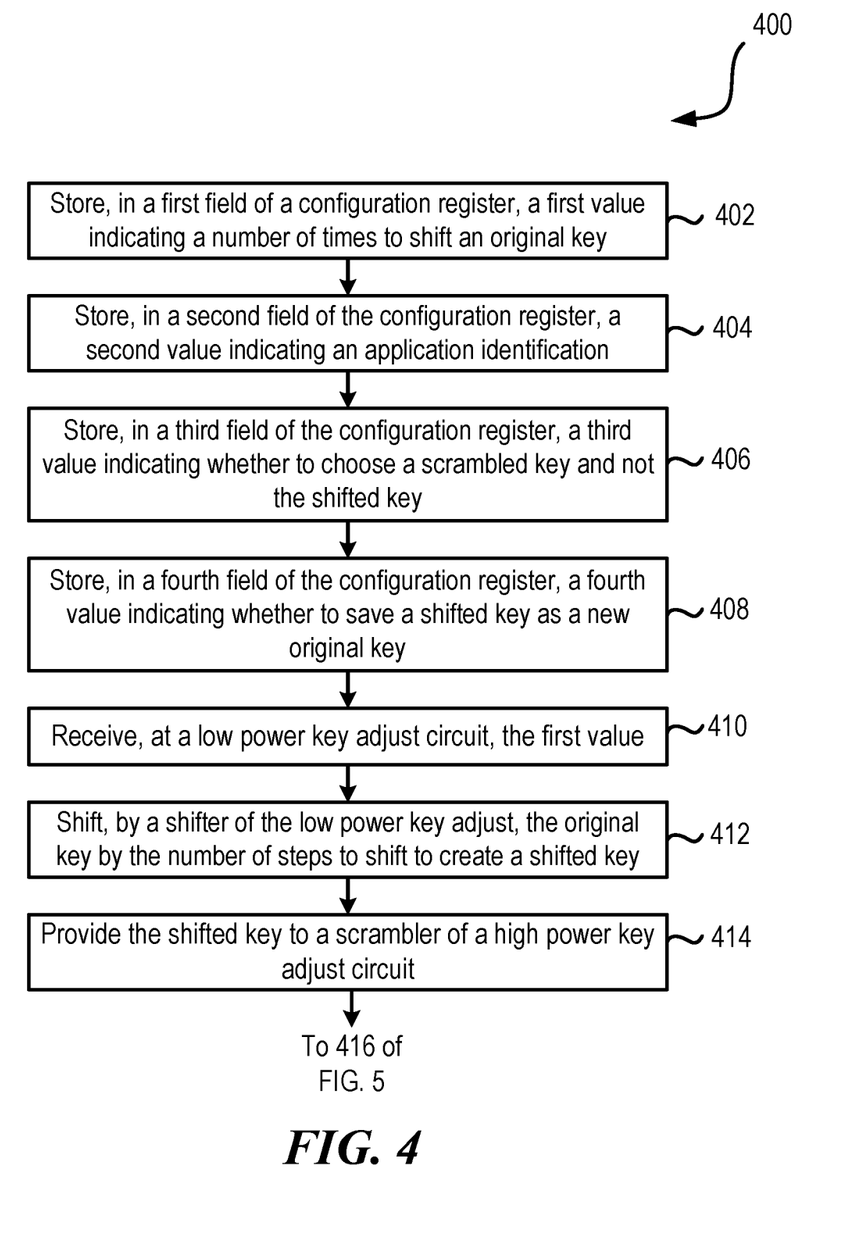
FIGS. 4 and 5 illustrate a flow diagram of another method for providing a key to encrypt data in accordance with at least one embodiment of the disclosure.
Figure 5:
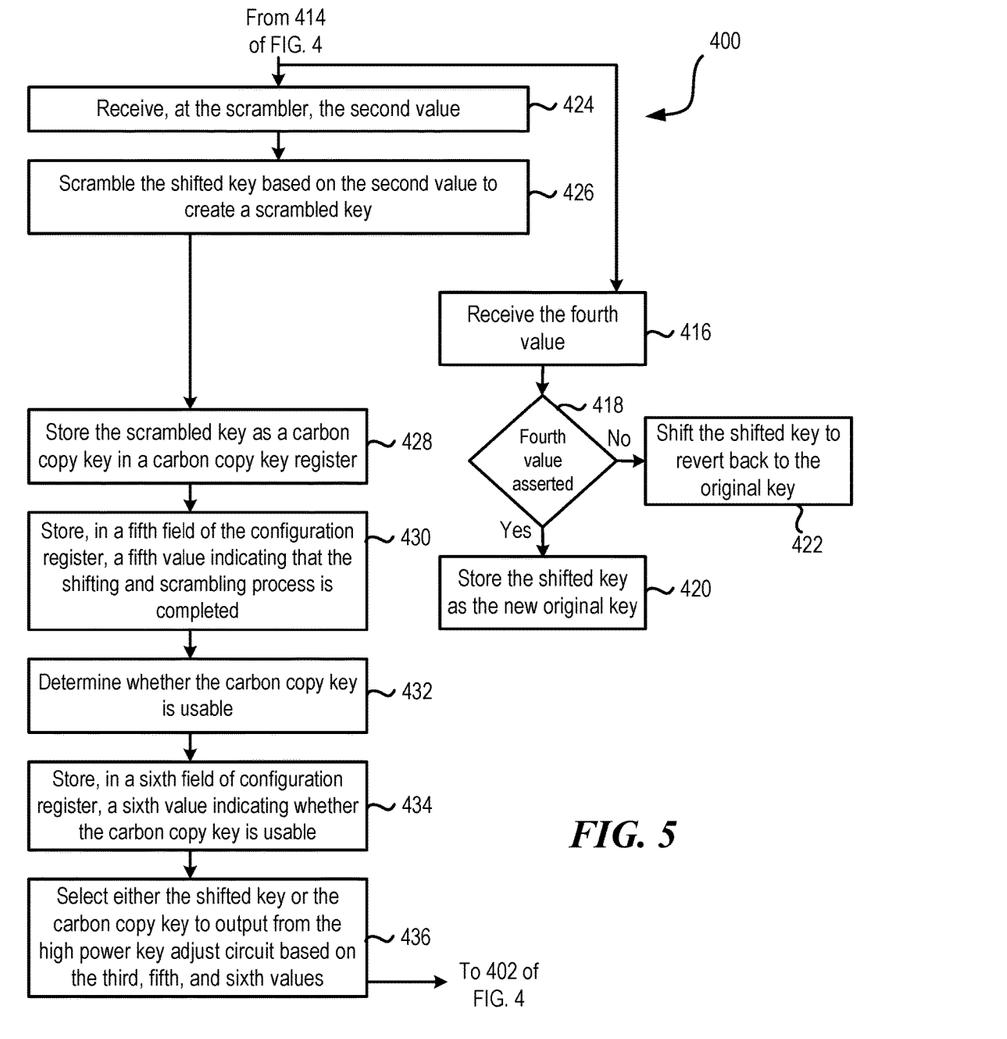

FIGS. 4 and 5 illustrate a flow diagram of another method for providing a key to encrypt data in accordance with at least one embodiment of the disclosure. At block 402, a first value indicating a number of times to shift an original key is stored in a first field of a configuration register. In an embodiment, value of the number of times to shift the original key is received from a security engine. A second value indicating an application ID is stored in a second field of the configuration register at block 404. In an embodiment, value of the application ID is received from the security engine, and is based on an application executing in a processor.

At block 406, a third value indicating whether to choose a scrambled key and not the shifted key is stored in a third field of the configuration register. In an embodiment, the third field is the select field 234 of FIG. 2. A fourth value indicating whether to save a shifted key as a new original key is stored in a fourth field of the configuration field at block 408. In an embodiment, the fourth field is the keep field 236 of FIG. 2. At block 410, the first value is received at a low-power key adjust circuit. The original key is shifted by the number of steps to shift to create a shifted key at block 412. In an embodiment, the shifter 214 of FIG. 2 performs the shifting of the original key. At block 414, the shifted key is provided to the high-power key adjust circuitry.

At block 416, the fourth value is provided to the high-power key adjust circuitry. At block 418, a determination whether the fourth value is asserted. If so, the shifted key is stored as the new original key at block 420. If the fourth value is negated, the shifted key is shifted to revert back to the original key at block 422.

The second value is received at the scrambler at block 424. At block 426, the shifted key is scrambled by the high-power scrambler based on the second value, i.e., the application ID, to create a scrambled key. In an embodiment, the scrambler can be a mash of wires and logic and utilizes the application ID to scramble the shifted key. At block 428, the scrambled key is stored as a carbon copy key in a carbon copy key register. In an embodiment, the operations of blocks 416-422 can be performed in the low-power key adjust circuit in parallel with the operations of blocks 424-428 in the high-power key adjust circuitry.

At block 430, a fifth value indicating that the shifting and scrambling process is completed is stored in a fifth field of the configuration register. A determination is made whether the carbon copy key is usable at block 432. At block 434, a sixth value indicating whether the carbon copy key is usable is stored in a sixth field of the configuration register. Either the shifted key or the carbon copy key is select to output from the high-power key adjust circuit based on the third, fifth, and sixth values of the configuration register at block 436.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof. For example, one skilled in the art would appreciate that a data processing system, such as a computer having an instruction based data processor, can be used to implement the analysis described herein.

In accordance with one aspect of the present disclosure, a method is disclosed. The method includes shifting, by a shifter of a low-power key adjust circuit, an original key by a number of steps to shift to create a shifted key. The method also includes providing, from the low-power key adjust circuit, a first key based on the shifted key to a scrambler of a high-power key adjust circuit. The method further includes scrambling, at the scrambler of the high-power key adjust circuit, the first key to create a second key that is scrambled. The method also includes outputting, at the high-power key adjust circuity, either the first key or the second key from the high-power key adjust circuit based on a select field in a configuration register.

In one embodiment, the method further includes storing, at a storage location of the high-power key adjust circuit, the second key prior to the outputting of the first key or the second key. In one embodiment, the method also includes scrambling, at a scrambler of the low-power key adjust circuit, the original key prior to creating the shifted key. In one embodiment, the method further includes determining, by the low-power key adjust circuit, whether a keep field in the configuration register is set to a predetermined value. The method also includes in response to the keep field being set to the predetermined value, storing the shifted key at the low-power key adjust circuit as a new original key, otherwise, shifting the shifted key to revert back to the original key.

In one embodiment, the method also includes determining whether the second key is valid prior to selecting either the first key or the second key. The method further includes in response to the second key being valid, storing a first value in a trivial field of the configuration register, otherwise, storing a second value in the trivial field of the configuration register. In one embodiment, the shifted key is scrambled based on an application identification, wherein the application identification identifies an application to utilize a key output from the high-power key adjust circuit. In one embodiment, the low-power key adjust circuit is provided power via a battery.

In accordance with one aspect of the present disclosure, a key generator is disclosed. The key generator includes a low-power key adjust circuit comprising a storage location to store an original key, a shifter to shift the original key by a number of steps to shift to create a first key, and an output to provide the first key. The key generator also includes a high-power key adjust circuit comprising an input coupled to the output of the low-power key adjust circuit to receive the first key, a scrambler to scramble the first key to create a scrambled key, and select circuitry to select either the first key or the scrambled key to output from the high-power key adjust circuit based on a bit in a configuration register.

In one embodiment, the low-power key adjust circuit further includes a scrambler, the scrambler to scramble the original key prior to the shifter creating the first key. In one embodiment, the low-power key adjust circuit further to determine whether a keep field in the configuration register is set to a predetermined value; and in response to the keep field being set to the predetermined value, to store the first key as a new original key, otherwise, to shift the first key to revert back to the original key. In one embodiment, the high-power key adjust circuit further to determine whether the scrambled key is valid prior to selecting either the first key or the scrambled key; and in response to the carbon copy key being usable, to store a first value in a trivial field of the configuration register, otherwise, to store a second value in the trivial field of the configuration register.

In one embodiment, the number of steps to shift the original key is stored as a value in a field of the configuration register. In one embodiment, the first key is scrambled based on an application identification, wherein the application identification identifies an application to utilize a key output from the high-power key adjust circuit. In one embodiment, the low-power key adjust circuit is provided power via a battery.

In accordance with one aspect of the present disclosure, another method is disclosed. The method includes shifting, by a shifter of a low-power key adjust circuit, an original key by a number of steps to shift to create a shifted key. The method also includes providing, from the low-power key adjust circuit, a first key based on the shifted key to a scrambler of a high-power key adjust circuit. The method further includes scrambling, at the scrambler of the high-power key adjust circuit, the first key to create a second key that is scrambled. The method also includes determining whether the second key is valid. The method further includes outputting the second key from the high-power key adjust circuit in response to the second key being valid, otherwise outputting the first key from the high-power key adjust circuit.

In one embodiment, the method also includes scrambling, at a scrambler of the low-power key adjust circuit, the original key prior to creating the shifted key. In one embodiment, the method further includes determining, by the low-power key adjust circuit, whether a keep field in a configuration register is set to a predetermined value. The method also includes in response to the keep field being set to the predetermined value, storing the shifted key as a new original key, otherwise, shifting the shifted key to revert back to the original key.

In one embodiment, the method further includes providing, by the low-power key adjust circuit, a ready signal to the high-power key adjust circuit, wherein the ready signal indicates that key shifting is complete and that the first key is valid. In one embodiment, the number of steps to shift the original key is stored as a value in a field of the configuration register. In one embodiment, the shifted key is scrambled based on an application identification, wherein the application identification identifies an application to utilize a key output from the high-power key adjust circuit.

In accordance with one aspect of the present disclosure, another method is disclosed. The method includes receiving, at a low-power key adjust circuit of a key generator, a number of steps to shift an original key. The method also includes shifting, by a shifter of the low-power key adjust circuit, the original key by the number of steps to shift to create a shifted key. The method further includes outputting, by the key generator, the shifted key as a generated key.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
shifting, by a shifter of a low-power key adjust circuit, an original key by a number of steps to shift to create a shifted key;
providing, from the low-power key adjust circuit, a first key based on the shifted key to a first scrambler of a high-power key adjust circuit;
scrambling, at the first scrambler of the high-power key adjust circuit, the first key to create a second key that is scrambled;
outputting, at the high-power key adjust circuity, either the first key or the second key from the high-power key adjust circuit based on a select field in a configuration register, wherein if the select field is asserted, the second key is selected, and
wherein if the select field is negated, the first key is selected; and
encrypting data using either the first key or the second key that is outputted at the high-power key adjust circuitry.

2. The method of claim 1 further comprising:
storing, at a storage location of the high-power key adjust circuit, the second key prior to the outputting of the first key or the second key.

3. The method of claim 1 further comprising:
scrambling, at a second scrambler of the low-power key adjust circuit, the original key prior to creating the shifted key.

4. The method of claim 1 further comprising:
determining, by the low-power key adjust circuit, whether a keep field in the configuration register is set to a predetermined value; and
in response to the keep field being set to the predetermined value, storing the shifted key at the low-power key adjust circuit as a new original key, otherwise, shifting the shifted key to revert back to the original key.

5. The method of claim 1 further comprising:
determining whether the second key is valid prior to selecting either the first key or the second key; and
in response to the second key being valid, storing a first value in a trivial field of the configuration register, otherwise, storing a second value in the trivial field of the configuration register.

6. The method of claim 1 wherein the shifted key is scrambled based on an application identification, wherein the application identification identifies an application to utilize a key output from the high-power key adjust circuit.

7. The method of claim 1 wherein the low-power key adjust circuit is provided power via a battery.

8. A key generator comprising:
a low-power key adjust circuit comprising a storage location to store an original key, a shifter to shift the original key by a number of steps to shift to create a first key, and an output to provide the first key; and a high-power key adjust circuit comprising an input coupled to the output of the low-power key adjust circuit to receive the first key, a first scrambler to scramble the first key to create a scrambled key, and select circuitry to select either the first key or the scrambled key to output from the high-power key adjust circuit based on a bit in a configuration register; and
to encrypt data using either the first key or the scrambled key that is outputted at the high-power key adjust circuitry.

9. The key generator of claim 8 the low-power key adjust circuit further includes:
a second scrambler, the second scrambler to scramble the original key prior to the shifter creating the first key.

10. The key generator of claim 8 the low-power key adjust circuit further to determine whether a keep field in the configuration register is set to a predetermined value; and in response to the keep field being set to the predetermined value, to store the first key as a new original key, otherwise, to shift the first key to revert back to the original key.

11. The key generator of claim 8 the high-power key adjust circuit further to determine whether the scrambled key is valid prior to selecting either the first key or the scrambled key; and in response to a carbon copy key being usable, to store a first value in a trivial field of the configuration register, otherwise, to store a second value in the trivial field of the configuration register.

12. The key generator of claim 8 wherein the number of steps to shift the original key is stored as a value in a field of the configuration register.

13. The key generator of claim 8 wherein the first key is scrambled based on an application identification, wherein the application identification identifies an application to utilize a key output from the high-power key adjust circuit.

14. The key generator of claim 8 wherein the low-power key adjust circuit is provided power via a battery.

15. A method comprising:
shifting, by a shifter of a low-power key adjust circuit, an original key by a number of steps to shift to create a shifted key;
providing, from the low-power key adjust circuit, a first key based on the shifted key to a first scrambler of a high-power key adjust circuit;
scrambling, at the first scrambler of the high-power key adjust circuit, the first key to create a second key that is scrambled;
determining whether the second key is valid; and
outputting the second key from the high-power key adjust circuit in response to the second key being valid, otherwise outputting the first key from the high-power key adjust circuit; and
encrypting data using either the first key or the second key that s outputted at the high-power key adjust circuitry.

16. The method of claim 15 further comprising:
scrambling, at a second scrambler of the low-power key adjust circuit, the original key prior to creating the shifted key.

17. The method of claim 15 further comprising:
determining, by the low-power key adjust circuit, whether a keep field in a configuration register is set to a predetermined value; and
in response to the keep field being set to the predetermined value, storing the shifted key as a new original key, otherwise, shifting the shifted key to revert back to the original key.

18. The method of claim 15 further comprising:
providing, by the low-power key adjust circuit, a ready signal to the high-power key adjust circuit, wherein the ready signal indicates that key shifting is complete and that the first key is valid.

19. The method of claim 15 wherein the number of steps to shift the original key is stored as a value in a field of a configuration register.

20. The method of claim 15 wherein the shifted key is scrambled based on an application identification, wherein the application identification identifies an application to utilize a key output from the high-power key adjust circuit.

* * * * *